United States Patent [19]
Jamieson

[11] Patent Number: 4,710,101
[45] Date of Patent: Dec. 1, 1987

[54] WIND TURBINE

[75] Inventor: Peter M. Jamieson, Stirling, Scotland

[73] Assignee: James Howden & Company Limited, Glasgow, Scotland

[21] Appl. No.: 856,049

[22] Filed: Apr. 25, 1986

[30] Foreign Application Priority Data

Apr. 26, 1985 [EP] European Pat. Off. ........ 85302983.3

[51] Int. Cl.⁴ .............................................. F03D 7/04
[52] U.S. Cl. ........................................ 416/32; 416/87; 416/169 R
[58] Field of Search ...................... 416/DIG. 7, 87, 32, 416/89 A, 169 B, 88-89, 23, 24

[56] References Cited

U.S. PATENT DOCUMENTS

| | | | |
|---|---|---|---|
| 1,757,667 | 5/1930 | Hesse | 416/89 A |
| 2,058,500 | 10/1936 | Plucker | 416/23 X |
| 2,074,149 | 3/1937 | Jacobs | 416/23 X |
| 2,076,520 | 4/1937 | Swanson | 416/87 X |
| 2,135,887 | 11/1938 | Fairey | 416/23 |
| 2,148,921 | 2/1939 | Allen | 416/23 |
| 2,437,659 | 3/1948 | Albers | |
| 2,485,543 | 10/1949 | Andreau | 416/23 X |
| 4,180,372 | 12/1979 | Lippert | 416/23 |
| 4,374,631 | 2/1983 | Barnes | 416/89 A X |
| 4,504,192 | 3/1985 | Cyrus et al. | 415/DIG. 1 A |
| 4,557,666 | 12/1985 | Baskin et al. | 416/32 |

FOREIGN PATENT DOCUMENTS

| | | | |
|---|---|---|---|
| 1006698 | 4/1952 | France | |
| 55893 | 9/1952 | France | 416/DIG. 7 |
| 1516196 | 1/1968 | France | |
| 222845 | 5/1925 | United Kingdom | 415/DIG. 1 A |
| 252461 | 5/1926 | United Kingdom | 416/87 |
| 2156006 | 10/1985 | United Kingdom | 416/89 A |
| 2157774 | 10/1985 | United Kingdom | 416/169 B |

Primary Examiner—Everette A. Powell, Jr.
Attorney, Agent, or Firm—Barnes & Thornburg

[57] ABSTRACT

A wind turbine for a wind turbine electrical generator set in which movable nose portions are located at or adjacent the leading edge of the blade and at or adjacent the tip of the blade but is dispaceable purely longitudinally of the blade, i.e. radially outwardly of the blade, from the normal retracted position, in which the portion contributes to the lift of the aerofoil section, to an advanced position in which drag is produced, to prevent unwanted increase in the speed of the rotation of the rotor.

9 Claims, 3 Drawing Figures

WIND TURBINE

The present invention relates to a wind turbine, for example for use in a wind turbine electrical generator set.

In recent years, such wind turbines have been constructed with several blades, usually at least three, of generally aerofoil cross-section. It is important to be able to prevent overrunning of the rotor in certain conditions. For example, when the turbine is run in a high wind and the load is interrupted, then an overspeed condition can suddenly occur because of its size this can set up severe vibrational problems and cause structural damage. Various proposals have been made to overcome this difficulty. One of these involves tilting the blade in an overspeed condition, usually sensed by a governor, so that the blade tilts about its own longitudinal axis thereby producing a slight stall effect to increase drag and thereby prevent the overspeed condition. The problem with such a structure is that the design requires a large, expensive and highly loaded hub with moving parts. It is also difficult to ensure fail-safe protection of the rotor from overspeed in the event of the failure of actuator motive power or linkages in the tilt mechanism.

An alternative proposal is to provide for tiltable or rotatable tips of the blades. The tilting of the blade tips has the same effect, to a lesser extent, as the tilting of the whole blade, and the problems of providing a suitable hub arrangement are significantly reduced. However, the problems are still high when one takes into consideration the space available for attachment and containing of the operating mechanism or linkages within the envelope and of an aerodynamically shaped blade cross-section. The required motion is rotary and this is usually achieved by having a linear actuator, moving longitudinally of the blade, and providing a helical drive so that linear movement causes rotation of the blade tip. This induces an inherent high degree of friction so that sensitive actuation of the blade tip cannot readily be achieved and the design is still quite expensive.

It is now proposed, according to the present invention, for a portion only of the cross-section of the aerofoil or of the cross-section of a blade support, which portion is located at or adjacent the leading edge, and at or adjacent the tip of the blade, said portion being displaceable longitudinally of the blade, or blade support from a normal retracted position, in which said portion contributes to the lift of said aerofoil cross-section, to an advanced position in which the drag is produced to prevent unwanted increase in the speed of rotation of the rotor.

This arrangement could be applied to a conventional, horizontal axis, axial flow wind turbine. It could equally be applied to a vertical or other axis cross-flow turbine, in which the blades entered at an acute angle or at right angles to the axis. The insertion could also be applied to a vertical axis turbine of the Musgrove type, in which a number of vertical axis aerofoil section blades are mounted around the axis of rotation on a blade support or supports. The movable portion would then be a part of the blade support (at or near the tip thereof, i.e. adjacent the blade it supports, this movable part, in the advanced position, being then radially outward of the blade which is supported.

The construction of the invention can be relatively simple and inexpensive and yet fully adequate in operation. While the movable portion of the blade can be longitudinally movable and rotatable at the same time, preferably the movable blade or blade support portions are displaceable only longitudinally of the associated rotor blade or support. This longitudinal movement can be produced simply by centrifugal force acting as the rotor reaches a particular rotational speed, the centrifugal force then preferably acting against a resilient radially inwardly directed force provided, for example, by a spring. Alternatively, or additionally, the movable blade portions are movable radially by electrical, pneumatic or hydraulic means, controllable in response to the speed of rotation of the rotor.

In a preferred construction, the cross-section of the movable portion is such as to overlap the major surfaces of the remainder of the respective aerofoil section. This has the advantage that the movable portion when in the normal, retracted position, will have little harmful effect on the aerodynamic shape of the aerofoil section, the flow lines of the air passing from the movable portion extremely smoothly onto the remainder of the aerofoil section.

The provision of the overlapping parts can be used to facilitate the guiding of the movable portions by these overlapping parts and the associated remainder of the aerofoil section being provided with cooperating guide key and keyway arrangements.

Each blade or support may additionally be provided with a longitudinally extending guide rod along which the associated portion is slidable.

Advantageously, the leading face of the remainder of the aerofoil section has a flat or concave surface to increase the drag effect when the portions are in the advanced position. Further to increase the drag effect, bleed passages may lead from the leading faces of the remainder of the aerofoil sections which are exposed when the movable portions are moved to the advanced position. This bleed passages can extend to a major surface of the remainder of the respective aerofoil section, to cause air to flow from the leading face to said major surface to cause separation of flow and increase drag. The portion exposed may in fact include part of the operating mechanism of the movable portion, which would even further increase the drag effect.

In order that the invention may more readily be understood, the following description is given, merely by way of example, reference being made to the accompanying drawings, in which.

Figure 1:
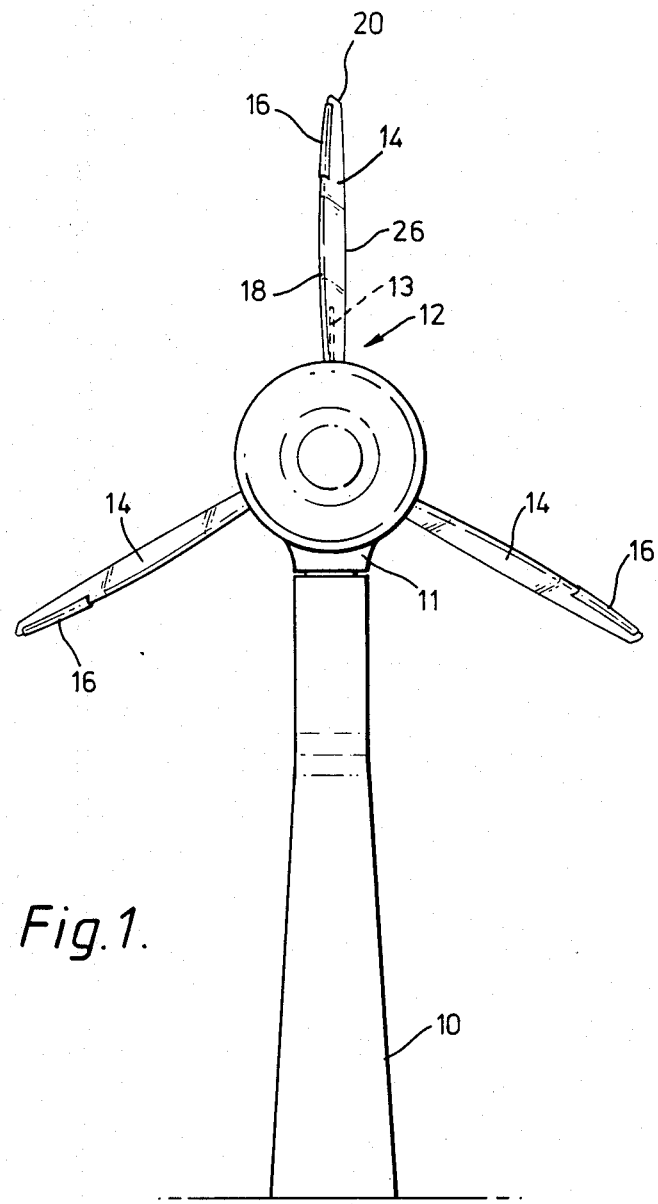
FIG. 1 is a schematic front elevation of a wind turbine according to the invention.

Referring to the drawings, the wind turbine comprises a conventional tower 10 having a rotatable head 11 upon which is mounted a rotor 12, the head being brought upwind by a vane 13. The rotor 12 includes blades 14 of aerofoil cross-section and each blade is provided at its leading edge 18 and adjacent the blade tip 20 with a movable nose portion 16. This portion 16 can move purely longitudinally of the blade radially outwardly thereof.

The aerofoil section is generally conventional having the leading edge 18, major upper and lower surfaces 22, 24 and a trailing edge 26.

It will be seen that the nose portion 16 provides some of the leading edge and has overlapping parts 28 which extend over some of the major surfaces 22, 24. The overlapping parts are provided with a key 30 engageable in a keyway 32 in the remainder of the blade to act as a guide with a longitudinal sliding motion of the nose portion 16.

A guide rod 34 is mounted in bearings 35 and is urged radially inwardly by a compression spring 36.

If desired a pneumatic or hydraulic or electrical actuator 37, mounted within the nose portion 16, can be used to cause the nose portion to move longitudinally of the blade in response to rotor speed.

Figure 2:
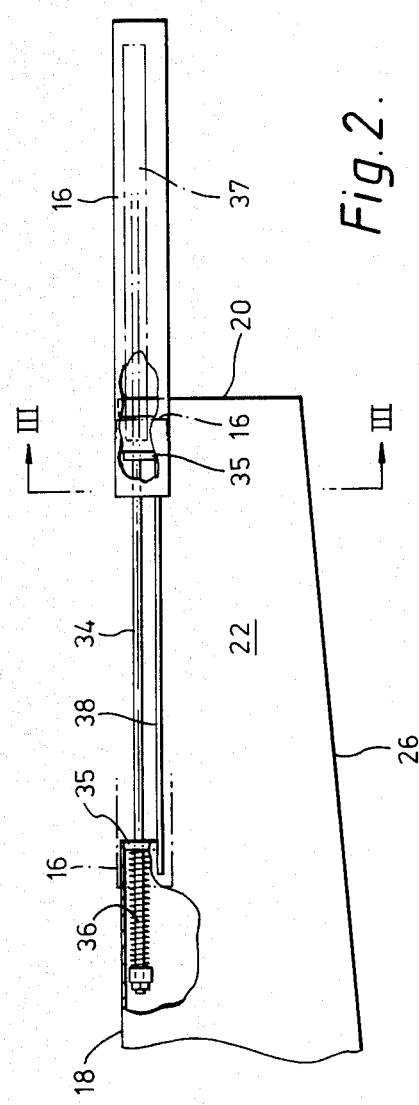
FIG. 2 is a front elevation of the tip of a blade of a rotor of the wind turbine of FIG. 1, with the movable portion in the advanced position.
Figure 3:
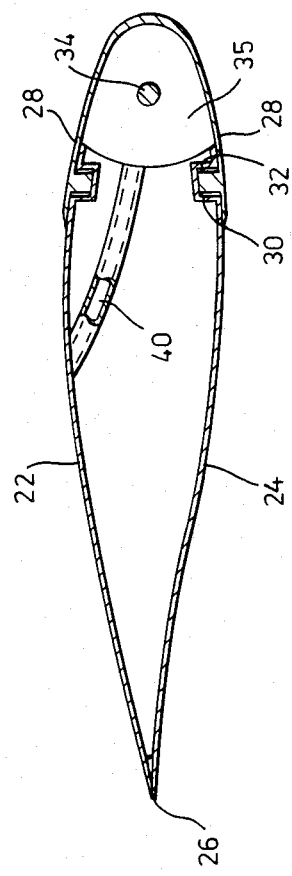
FIG. 3 is a section taken along the line 3—3 of FIG. 2.

The nose portion can be moved from a retracted or normal position, indicated in phantom in FIG. 2, to an advanced position indicated in full line in FIG. 2.

In the advanced position, a leading face 38, which is illustrated as concave or maybe flat, is exposed. Extending from this leading face is a bleed passage 40 which opens on one of the major surfaces 22 of the aerofoil section.

When the speed of rotation of the rotor reaches a value which is the maximum value which can be tolerated, the nose portions 16 move radially outwardly either solely under the action of centrifugal force against the return force of the springs 36, or together with assistance from the actuators 37 and the leading faces 38 are exposed. The outward movement of the nose portions 16 will itself cause an effective reshaping of the cross-section of the blades so they do not resemble an aerofoil section at all, at the tip of the blade. This will have three effects. Firstly, it will destroy lift on a section of the blade where the most power is produced. Secondly, it will create much more drag on the exposed section, that is the leading face, which may be contoured or roughened to produce maximum drag. Finally, the displaced nose sections 16 create drag at a radius beyond the normal position of the tip, where the velocity is higher and the effectiveness is greater.

The provision of the bleed passages 40 will cause some of the air to flow over the major surfaces 22, thereby causing separation and increasing the drag effect.

It will be appreciated that the actual structure is relatively simple and does not produce any untoward forces, so that the bearings, guiderod, keys and keyways can be of a relatively light construction. While actuators 37 may be provided, these can be simple piston and cylinder arrangements and there is no need to provide for any twisting of the tip and the inherent frictional forces which have previously been necessary.

Thus, the wind turbine of the present invention can be made to respond very quickly to sudden excess wind speed and can be constructed relatively inexpensively.

I claim:
1. A wind turbine comprising, in combination:
   (a) a rotor;
   (b) a plurality of circumferentially spaced blades on said rotor;
   (c) an aerofoil cross-section to each of said blades;
   (d) major upper and lower surfaces of said aerofoil cross-section;
   (e) a leading edge and a trailing edge of said aerofoil cross-section;
   (f) a tip of each said blade;
   (g) a nose portion of the leading edge of each blade adjacent the blade tip, said nose portion having a shape conforming to a part of the leading edge of the aerofoil cross-section;
   (h) guide means guiding said nose portion for movement longitudinally of the associated blade; and
   (i) a remaining forwardly facing portion of each said blade, normally covered by said nose portion, said remaining forwardly facing portion having a different, high drag shape than said leading edge, said high drag shape being revealed only when said nose portion is moved longitudinally radially outwardly of the rotor axis to a displaced position.

2. A wind turbine according to claim 1, wherein each said nose portion is displaceable only longitudinally of the associated rotor blade.

3. A wind turbine according to claim 1, wherein the cross-section of each said nose portion overlaps a part of said major upper and lower faces of the respective aerofoil sections.

4. A turbine according to claim 3, wherein the overlapping part of each of said nose portions and the associated remaining portions of the aerofoil section each further comprise cooperating guide key and keyway arrangements.

5. A turbine according to claim 4, wherein each blade further comprises a longitudinally extending guide rod along which the associated portion is slidable.

6. A wind turbine according to claim 1, wherein the face of said remaining forwardly facing portion of each of said blades comprises a flat or concave surface.

7. A wind turbine according to claim 1, and further comprising bleed passages which lead from said remaining forwardly facing portions which are exposed when said nose portions are moved to said displaced position, said bleed passages extending to said major upper or lower surface of the respective aerofoil section, effective to cause air to flow from said remaining forwardly facing portion to said major surface, effective to cause separation and increased drag.

8. A wind turbine according to claim 1, wherein each of the movable blade portions further comprise means to urge them resiliently radially inwardly of the associated blade.

9. A wind turbine according to claim 1, and further comprising actuating means, controllable in response to the speed of rotation of the rotor to urge each of the movable blade portions radially outwardly, and means to urge said blade portion resiliently, radially inwardly of the associated blade.

* * * * *

UNITED STATES PATENT AND TRADEMARK OFFICE
CERTIFICATE OF CORRECTION

PATENT NO. : 4,710,101
DATED : December 1, 1987
INVENTOR(S) : Peter M. Jamieson

It is certified that error appears in the above-identified patent and that said Letters Patent is hereby corrected as shown below:

At column 4, line 27, please delete "faces" and insert therefor --surfaces--;

At column 4, line 29, after "A" insert --wind--; and

At column 4, line 34, after "A" insert --wind--.

Signed and Sealed this

Third Day of May, 1988

Attest:

Attesting Officer

DONALD J. QUIGG

Commissioner of Patents and Trademarks